United States Patent
Mazarguil

(10) Patent No.: US 9,708,055 B2
(45) Date of Patent: Jul. 18, 2017

(54) AIRCRAFT WHEEL WITH ROTATIONAL DRIVE ATTACHED TO CLEVISES PROJECTING FROM WHEEL RIM

(71) Applicant: MESSIER-BUGATTI-DOWTY, Velizy Villacoublay (FR)

(72) Inventor: Nicolas Mazarguil, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 271 days.

(21) Appl. No.: 14/534,332

(22) Filed: Nov. 6, 2014

(65) Prior Publication Data
US 2015/0137581 A1    May 21, 2015

(30) Foreign Application Priority Data
Nov. 15, 2013   (FR) ..................... 13 61228

(51) Int. Cl.
  *B64C 25/40*  (2006.01)
  *B60B 27/00*  (2006.01)
  *F16H 7/06*   (2006.01)

(52) U.S. Cl.
  CPC ........ *B64C 25/405* (2013.01); *B60B 27/0015* (2013.01); *F16H 7/06* (2013.01); *Y02T 50/823* (2013.01)

(58) Field of Classification Search
  CPC ....... B64C 25/405; B64C 25/24; B64C 25/30; Y02T 50/54
  USPC ............... 301/6.1–6.2; 244/50, 103 R, 103 S
  See application file for complete search history.

(56) References Cited

U.S. PATENT DOCUMENTS

| | | | |
|---|---|---|---|
| 4,379,414 A | 4/1983 | Dannatt | |
| 2006/0035739 A1 | 2/2006 | Osborn et al. | |
| 2013/0026284 A1 | 1/2013 | Christensen et al. | |
| 2015/0210385 A1* | 7/2015 | Didey | B64C 25/405 244/50 |

FOREIGN PATENT DOCUMENTS

| | | |
|---|---|---|
| EP | 2 551 192 A2 | 1/2013 |
| EP | 2 639 160 A2 | 9/2013 |
| WO | 2012/171589 A1 | 12/2012 |

OTHER PUBLICATIONS

French Search Report for FR 13 61228 dated Jun. 10, 2014.

* cited by examiner

*Primary Examiner* — Jason Bellinger
(74) *Attorney, Agent, or Firm* — Sughrue Mion, PLLC

(57) ABSTRACT

An aircraft wheel equipped with rotation-drivers (10) attached to clevises (19) projecting from a side of wheel rim (5). The rotation driver includes a ring (11) that is adapted to cooperate with a drive actuator and is provided with members (12) for attaching to the clevises in such a way that, between two attachment members, the ring forms a flexible and deformable segment.

5 Claims, 3 Drawing Sheets

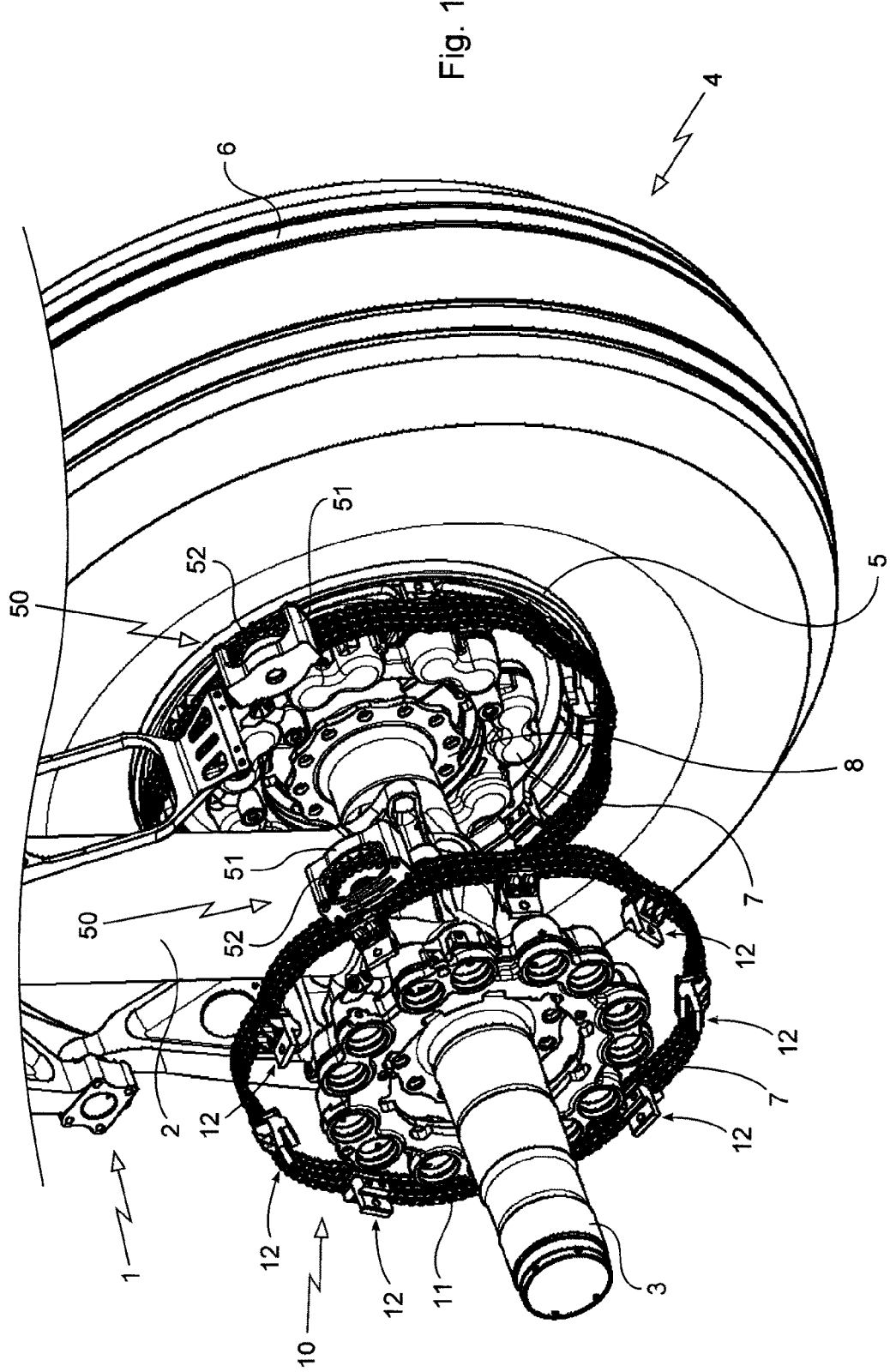

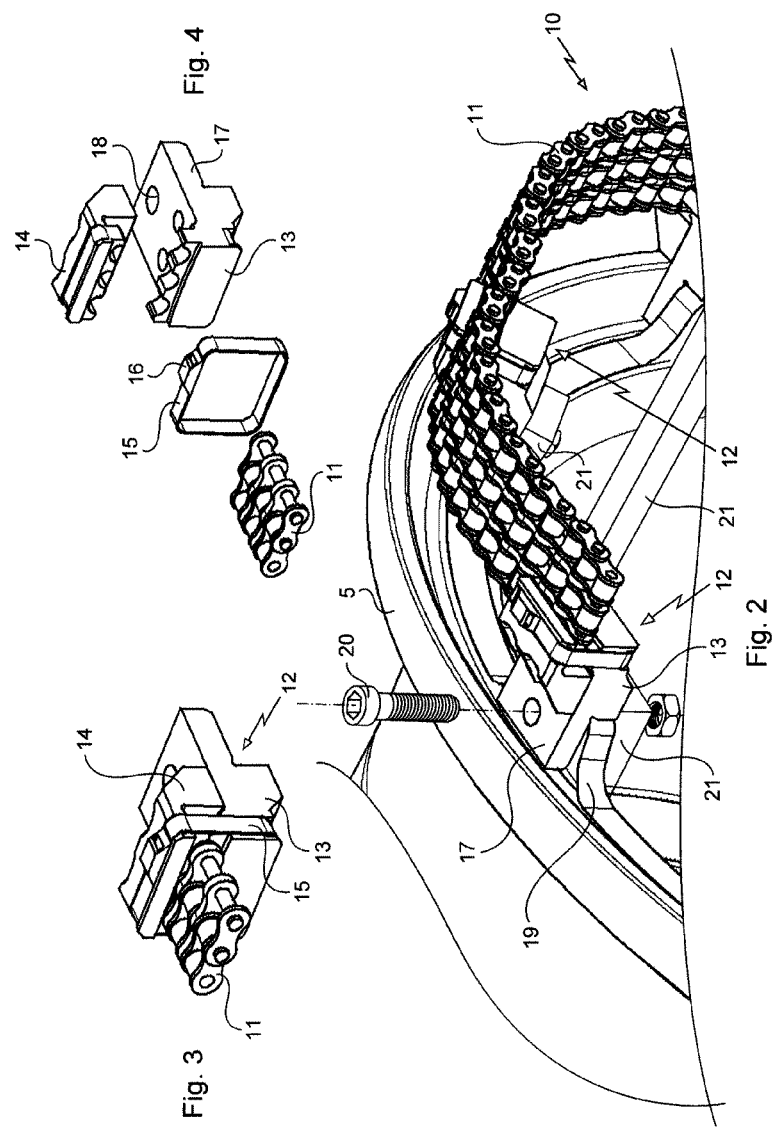

AIRCRAFT WHEEL WITH ROTATIONAL DRIVE ATTACHED TO CLEVISES PROJECTING FROM WHEEL RIM

The invention relates to an aircraft wheel equipped with means for rotationally driving it by means of a drive actuator.

TECHNOLOGICAL BACKGROUND OF THE INVENTION

The advantage of motorizing the wheels of an aircraft in order to be able to move it without the aid of its propulsion units has recently been recognized. In this regard, aircraft wheels provided with means for rotationally driving them by means of a drive actuator attached to the bottom part of the landing gear are known. These drive means comprise a toothed ring mounted rigidly on the rim of the wheel. This type of attachment may prove difficult to reconcile with the deformations of the wheel, in particular the ovalization thereof during the taxiing of the aircraft, and the movement thereof due to the bending of the axle to which the wheel is attached.

Recently, it has been proposed in document EP 2 639 160 to attach a toothed ring to a wheel rim via attachment members having clearances able to allow a relative movement between the toothed ring and the rim of the wheel. These attachments require in particular ball joint-type elements which are complex and costly.

SUBJECT OF THE INVENTION

The subject of the invention is an aircraft wheel equipped with rotational drive means making it possible to absorb these deformations while not requiring complex attachments.

PRESENTATION OF THE INVENTION

In order to achieve this aim, there is proposed an aircraft wheel equipped with rotational drive means attached to clevises projecting from a flank of a rim of the wheel, the drive means comprising a ring able to cooperate with a drive actuator and provided with members for attaching to the clevises of the rim such that, between two attachment members, the ring forms a flexible and deformable segment.

Thus, the ring can cooperate with a drive actuator comprising for example a drive pinion associated with two rollers for applying the ring against the drive pinion. The rotation of the drive pinion causes the ring to travel opposite the drive pinion, and therefore causes the wheel to rotate by transmission of a drive force by the attachment members. The flexibility of the segments of the ring makes it possible to absorb deformations and movement of the wheel.

According to one particular embodiment, the ring comprises a chain with a plurality of tracks of which some of the links are held by jaws of the attachment members.

According to one particular embodiment of the invention, the attachment members are adapted to be fixed to the clevises which serve, moreover, to fix drive bars for brake discs engaged in the rim. This arrangement makes it possible to use standard rims.

PRESENTATION OF THE FIGURES

The invention will be better understood in light of the following description of one particular non-limiting embodiment of the invention, with reference to the figures of the appended drawings in which:

FIG. 1 is a perspective view of the bottom of an aircraft landing gear having two wheels, one of the wheels having been omitted for greater clarity;

FIG. 2 is a partial perspective view of the rim of FIG. 1 showing the attachments of the drive means of the invention;

FIG. 3 is a perspective view of a member for attaching the drive means to the rim of FIG. 2;

FIG. 4 is an exploded view of the attachment member of FIG. 3;

DETAILED DESCRIPTION OF ONE EMBODIMENT OF THE INVENTION

Figure 5:
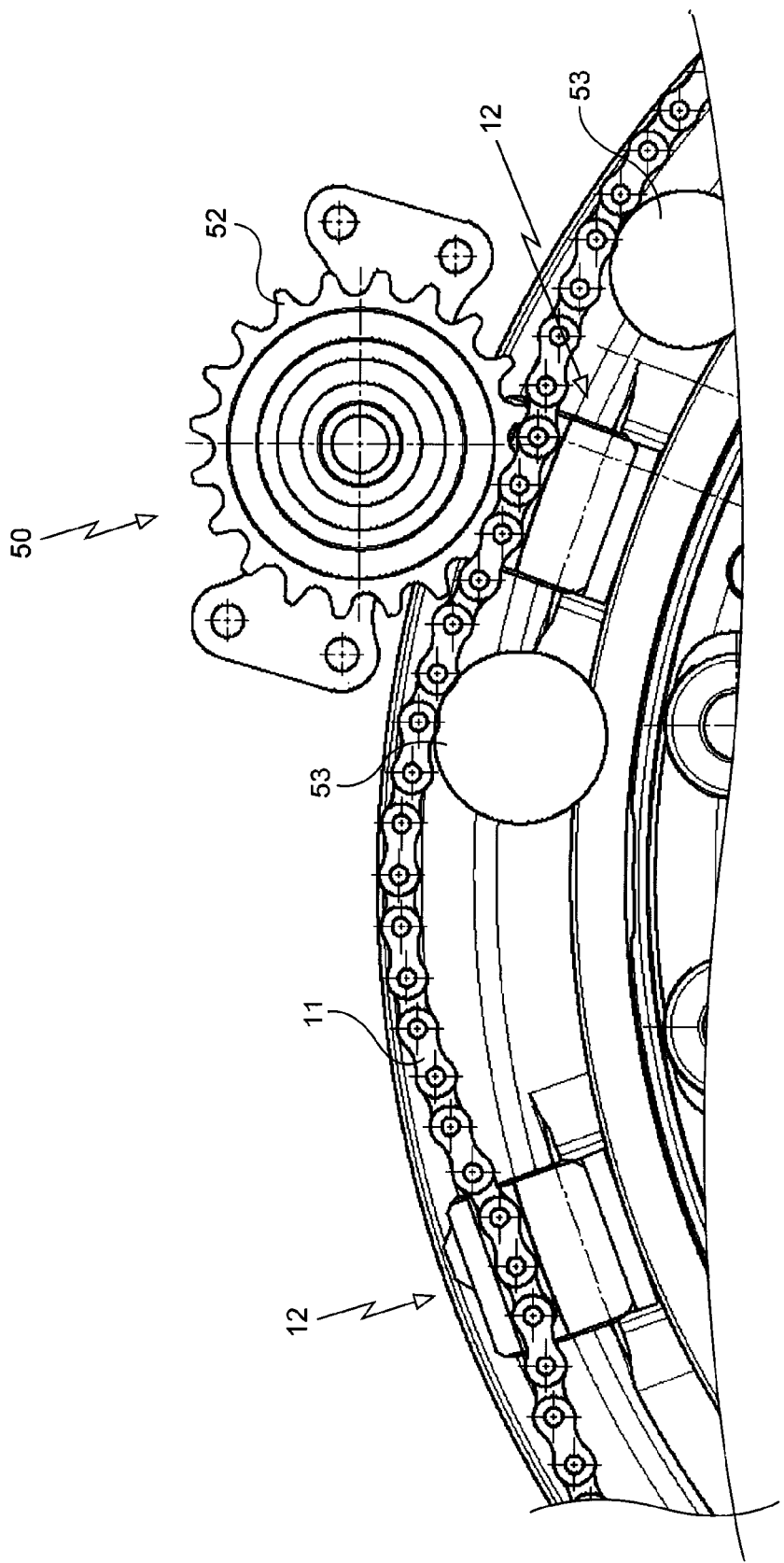
FIG. 5 is a partial front view of one of the rims situated on the landing gear of FIG. 1.

FIG. 1 illustrates a main aircraft landing gear 1 of which there can be seen here the sliding rod 2 which bears an axle 3 adapted to receive two wheels 4 (one of which has been omitted for greater clarity). Each of the wheels 4 comprises a rim 5 mounted to turn on the axle by means of bearings. The rim 5 bears a tyre 6 and here receives brake discs (not shown) which are selectively pressed against one another by a braking actuator 7, here a hydraulic ring fixed to an axle flange 8. All this is well known and is stated only by way of illustration.

The wheels 4 are equipped with rotational drive means 10 which here comprise a chain 11 configured as a ring (here a chain with three tracks) which is secured to the rim 5 by attachment members 12.

As can be seen more particularly in FIGS. 2 to 4, each attachment member 12 here comprises an internal jaw 13 and an external jaw 14 which have sets of teeth configured to penetrate on either side of links of one of the external tracks of the chain 11, and thus clamp the said links. The jaws 13, 14 are maintained in a clamped position on the chain 11 by a ligament 15 provided with clamping means 16. Alternatively, use may be made of any other means of maintaining the two jaws in position on the chain, such as screws. The lower jaw 13 is extended by a tab 17 provided with an orifice 18 which allows it to be fixed to a clevis 19 of the rim 5 which projects from a flank thereof, by means of a bolt 20.

According to one particular aspect of the invention, the clevises 19 to which the attachment members 12 are attached are precisely the clevises which serve to fix brake bars 21 which serve to rotationally secure the rim 5 with the rotor discs of the brake (not shown here).

As can be seen in FIG. 1, the chain 11 is intended to cooperate with a drive actuator, of which only the end 50 which cooperates with the chain has been illustrated here for greater clarity. The end 50 comprises a casing 51 which receives a drive pinion 52 and two rollers 53 for guiding the chain which are arranged on either side of the drive pinion 52 in opposition thereto, which can be seen more particularly in FIG. 5. The drive pinion 51 and the guide rollers 53 turn about axes parallel to the axis of rotation of the wheel.

Of course, the drive pinion 52 is driven by a motor of the actuator, the actuator being fixed to a support secured to the sliding rod 2. Thus, a rotation of the drive pinion 52 causes a travel of the chain, which transmits a rotational torque to the wheel via the attachment members 12.

According to one important aspect of the invention perfectly visible in FIG. 5, the chain 11 forms, between two attachment members 12, flexible and therefore deformable segments which make it possible to absorb both a deformation and a movement of the wheel opposite the drive actuator.

The invention is not limited to what has just been described, but on the contrary encompasses any variant coming within the scope defined by the claims.

In particular, although here the members for attaching the drive means are fixed to the clevises which serve to maintain the brake bars, it will of course be possible to provide on the rim specific clevises in order to attach thereto the members for attaching the drive means.

Although the drive means here comprise a chain with three tracks, it will of course be possible to use other types of chains, and more generally any drive means able to cooperate with a drive actuator carried by the landing gear, provided that it has flexible segments between two attachment members.

The invention claimed is:

1. An aircraft wheel comprising:
a wheel rim (5);
clevises (19) projecting from a side of said wheel rim;
rotation-drivers (10) attached to said clevises (19); and
a drive actuator,
wherein the rotation-drivers comprise a ring (11) cooperative with the drive actuator and provided with attachment members (12) for being attached to the clevises, and
wherein between two attachment members, the ring forms a flexible and deformable segment.

2. The aircraft wheel according to claim 1, wherein the ring comprises a chain (11) with a plurality of tracks.

3. The aircraft wheel according to claim 2, wherein each attachment member (12) comprises jaws (13, 14) adapted to clamp links of the chain.

4. The aircraft wheel according to claim 3, wherein at least one of the jaws is fixed to one of the clevises (19) of the rim.

5. The aircraft wheel according to claim 1, further comprising brake bars (21) which are fixed to the same clevises as the attachment members of the rotation-drivers.

* * * * *